United States Patent [19]

Amen et al.

[11] Patent Number: 4,851,239

[45] Date of Patent: Jul. 25, 1989

[54] SHELF-STABLE AEROSOL DISPENSABLE YOGURT PRODUCTS

[75] Inventors: Ronald C. Amen, Villa Park; Christine F. Smith, Capistrano Beach, both of Calif.; Abraham I. Bakal, Parsippany, N.J.

[73] Assignees: Kathleen M. Dalziel, Los Angeles; Marshall N. Swerman, Studio City, both of Calif.

[21] Appl. No.: 102,472

[22] Filed: Sep. 29, 1987

[51] Int. Cl.$^4$ .............................................. A23C 9/137
[52] U.S. Cl. ....................................... 426/43; 426/61; 426/583; 426/654; 426/580; 426/116; 426/130; 426/564; 426/570
[58] Field of Search ....................... 426/34, 42, 43, 61, 426/63, 583, 573–658, 116, 130, 394, 565, 567, 569, 570, 580, 654, 564

[56] References Cited

U.S. PATENT DOCUMENTS

| | | | |
|---|---|---|---|
| 3,961,494 | 6/1976 | Schaefer et al. | 426/565 |
| 4,110,476 | 8/1978 | Rhodes | 426/41 |
| 4,178,390 | 12/1979 | Igoe | 426/43 |
| 4,374,155 | 2/1983 | Igoe et al. | 426/569 |

*Primary Examiner*—Marianne Cintins
*Attorney, Agent, or Firm*—Lyon & Lyon

[57] ABSTRACT

Shelf-stable aerosol dispensable yogurt products are disclosed. These products contain a stabilizer system comprising a preponderant amount of microcrystalline cellulose together with carboxymethylcellulose and a hydrophillic gum or colloid such as xanthan gum, and can be used as desserts and as toppings for other dessert items.

20 Claims, No Drawings

SHELF-STABLE AEROSOL DISPENSABLE YOGURT PRODUCTS

FIELD OF THE INVENTION

This invention provides the first successful shelf-stable aerosol dispensable yogurt products. More particularly, this invention relates to unique stabilizer systems which permit, for the first time, formulation of aerosol dispensable yogurt desserts and dessert toppings which are shelf-stable under dairy case refrigeration for up to three months. These yogurt products are dispensed from their aerosol containers in the form of whipped, creamy foams which have good foam properties, including foam stability and the absence of syneresis ("weeping" or "runniness"), pleasing texture and mouth feel (freedom from chalkiness, graininess or grittiness) and good flavor characteristics, including freedom from off-flavor or bitter aftertaste, all of which makes them well suited for use as desserts per se and as topping for other dessert items.

BACKGROUND OF THE INVENTION

Yogurt, a fermented dairy product, is an ancient foodstuff that has gained increasing popularity in recent years, particularly with the advent of such yogurt variants as lowfat and nonfat yogurts, frozen yogurts of various types and flavors, fruit-filled and other flavored yogurts and even drinkable yogurts and other yogurt-containing drinks.

To be called yogurt or have the word yogurt as part of its name any fermented dairy product sole in this country must be formulated and processed according to the definitions and limitations of the U.S. Food and Drug Administration's Standards of Identity for yogurt products as set out at 21 CFR §§ 131.200 et seq.

Yogurt products which meet the FDA's Standards of Identity are produced by culturing cream, milk, partially skimmed milk, skimmed milk or mixtures of these "optional dairy ingredients" to at least a given minimum quantity of titratable acidity using a characterizing bacterial culture that contains the lactic acid producing bacteria, *Lactobacillus bulgaricus and Streptococcus thermophilus*. The Standards of Identity also place strict limitations on the types and amounts of vitamins, other optional dairy and nondairy ingredients, flavoring additives, color additives and stabilizers which may be present, prescribe the percentages of milkfat and milk solids which yogurt products must contain and spell out how the product is to be treated before and after the bacterial culture is added. Given these strictures, and experience with one unsuccessful commercial attempt several years ago to formulate an aerosol dispensable yogurt product, persons skilled in the art of yogurt manufacture have considered it impossible to formulate a shelf-stable yogurt product which could be stored in and dispensed from an aerosol can and still meet the definitions and limitations of the Standards of Identity for yogurt products.

The known prior art gives no reason to suppose that this is not true; typically, patents directed to yogurt products of various kinds are silent with regard to aerosol dispensability.

U.S. Pat. No. 4,374,155, issued Feb. 15, 1983 to Igoe et al, for example, discloses "yogurt milk shake" formulations which contain a soya protein whipping agent and, as a stabilizer, xanthan gum with or without carboxymethylcellulose. These yogurt milk shakes:

"... could be sold commercially in ½ pint to 1 pint containers sealed with sufficient headspace to allow for shaking by the end user/consumer, whereby air in the headspace is entrapped in the yogurt/milk mixture to produce the final product: a thickish, frosty shake", column 4, lines 16–21. It would appear that the substantial amount of milk (20–47%) required in Igoe et al's formulations to achieve a milkshake-type product would preclude packaging such formulations in aerosol cans from which a whipped product could then be dispensed.

U.S. Pat. No. 4,110,476, issued Aug. 29, 1978 to Rhodes, discloses liquid yogurt base and frozen yogurt mix formulations which will yield in the case of liquid yogurt a product:

"... which will remain drinkable and not thicken with age, will hold fruit particles in suspension, and will not develop objectionable off-flavors ...", column 1, lines 8–11, and in the case of frozen yogurt a product:

"... with no casein precipitate, no bitter aftertaste and a firm heavy body ...", column 1, lines 11–13.
According to the Rhodes patent:

"The important aspect of this invention is the use of the whey proteins, lactalbumin and lactalglobumin, with whey protein concentrate as the source, to maintain solubilization of casein to prevent high curd tension development by agglomeration of the casein colloid particles", column 4, lines 38–43. The Rhodes patent contrasts this casein -solubilizing property of whey proteins in its yogurt formulations with what it intimates is the unacceptable behavior of hydrophillic gums or colloids such as sodium alginate and its derivatives, xanthan gum, Locust Bean gum, pectin and Guar gum, all of which are said to react with casein to "... form heavy weight colloid particles which are large in size and, hence, will precipitate more readily"; column 9, lines 11–36.

U.S. Pat. No. 3,961,494, issued June 8, 1976 to Schaefer et al, does speak of pressurized dispensing of:

"... a soft food mix or frozen confection, such as soft ice cream, milk shakes, yogurt, or the like", column 1, lines 7–9. No formulation details are given, however, and in fact this mention of yogurt is made only in the context of large scale commercial retail operations in which:

"... the constituents of such soft food products are mixed in large quantities at some central location and then shipped under refrigeration in pressurized containers to the individual shops where the product is sold. The product is often combined with nitrous oxide and/or Freon (Trademark) which expands the volume of the product. The amount of nitrous oxide or other gas added is usually expressed as 'percentage overrun".

"The gases usually are added to the soft food mix in the dispensing machine and particularly as the soft food mix moves under pressure from the refrigerated container within the machine to the dispensing valve. However, it is also possible, and preferable under most circumstances, to add the gases at the central location before the soft food mix is placed in the containers in which it is transported to the dispensing machines", column 1, lines 10-28. Hence, Schaefer et al's disclosure in this respect merely serves as a backdrop for its teaching of an improved dispensing machine for such commercially dispensed soft foods.

It is an object of this invention to provide shelf-stable aerosol dispensable yogurt products.

Another object of the invention is to provide unique stabilizer systems which permit yogurt and yogurt-containing products to be prepared as shelf-stable aerosol dispensable formulations useful as desserts and as toppings for other dessert items.

A further object of this invention is to provide shelf-stable aerosol dispensable yogurt products containing such stabilizer systems.

A still further object of this invention is to provide methods of formulating such shelf-stable aerosol dispensable yogurt products.

These and other objects, as well as the nature, scope and utilization of this invention, will become readily apparent to those skilled in the art from the following description and the appended claims.

SUMMARY OF THE INVENTION

Stabilizer systems comprising:

(a) a preponderant amount of microcrystalline cellulose, i.e., at least about 50%, and preferably from about 70% to about 80% by weight of this substance, together with (b) an amount of carboxymethylcellulose ranging from about 2% to about 20%, and preferably from about 5% to about 10% by weight, and (c) an amount of a hydrophillic gum or colloid such as xanthan gum ranging from about 2% to about 20%, and preferably from about 5% to about 10% by weight, these weight percentages each being based on the total weight of the stabilizer system, with the amounts of carboxymethylcellulose and xanthan gum or the like employed preferably being in an approximately 1:1 weight ratio and with the total amount of this three component stabilizer system employed ranging from about 0.1% to about 1.0%, and preferably from about 0.4% to about 0.6% by weight, based on the total weight of the finished product, have been found to permit yogurt to be formulated into shelf-stable aerosol dispensable products which still meet the FDA's Standards of Identity.

Microcrystalline cellulose, carboxymethylcellulose and hydrophillic gums or colloids such as xanthan gum have been used individually and with other materials as stabilizers for foods containing dairy products, including yogurt—see for example the disclosure of xanthan gum, carboxymethylcellulose and mixtures of these two materials as stabilizers in the Igoe et al patent (column 1, lines 5-15 and 53-62) and the disclosure of carboxymethylcellulose as a stabilizer, with and without microcrystalline cellulose but, as mentioned above, without xanthan gum or the like, at column 7, lines 21-54 of the Rhodes patent. Other hydrocolloid-containing stabilizer systems for yogurt products have also been suggested; see for example the propylene glycol alginate/sodium alginate/guar/carrageenan stabilizer systems for soft serve and hard frozen yogurt disclosed in U.S. Pat. No. 4,178,390, issued Dec. 11, 1979 to Igoe. None of these prior art teachings, however, even hint at the results achievable by means of this invention.

DETAILED DESCRIPTION OF THE INVENTION

When practicing this invention one or a blend of the optional dairy ingredients permitted by the FDA's Standards of Identity for yogurt, preferably a blend of skim milk and nonfat dry milk, is thoroughly mixed with the stabilizer system and, if desired, other optional ingredients to form an initial blend.

The stabilizer system may contain other materials in addition to the aforementioned three components.

Mono- and diglycerides, for example, are emulsifying agents commonly employed in dairy products which can be added to help stabilize the whipped yogurt foam after it has been dispensed from the aerosol container. The amount of such emulsifying agents, if employed, will, in general, by within the range customarily employed in aerosol dispensed foodstuffs (whipped cream and other dessert toppings, for example), i.e., from about 0.015% to about 0.045%, and preferably from about 0.025% to about 0.035% by weight, based on the total weight of the finished product.

Hydrophillic gums and colloids other than xanthan gum, such as Locust Bean gum, carrageenan, Guar gum, sodium alginate, gum Arabic, and the like, can be used, first of all, to replace all, or preferably from about 30% to about 70%, of the xanthan gum present, provided that in doing so the odor, flavor and taste of any particular formulation in which such a substitution is made are not adversely affected. Such other hydrophillic gums and colloids are commonly used as thickening agents as well as stabilizers in dairy products, since as noted in the Rhodes patent they interact with milk proteins to form gels and colloids which aid in giving "body" to the product. Formulations prepared in accordance with this invention can also contain small amounts of these other hydrophillic gums and colloids as thickening or bodying agents in addition to the aforementioned amounts of hydrophillic gums and colloids such as xanthan gum in the three component stabilizer system, e.g., additional amounts of these other hydrophillic gums and colloids up to about 0.1% by weight, and preferably amounts ranging from about 0.02% to about 0.06% by weight, based on the total weight of the finished product.

Other optional ingredients which can be employed in the initial blends of this invention include, first of all, gelatin, which may be added in amounts ranging from about 0.1% to about 0.5%, and preferably from about 0.2% to about 0.3%, be weight, based on the total weight of the finished product. Gelatin lends additional body to the product and can contribute additional protein to aid in the development of a more stable foam system. Other materials which can be used instead of or together with gelatin for this purpose include sodium and potassium caseinate and other dairy proteins, e.g., whey proteins, which can be used in the initial blend in amounts ranging from about 0.5% to about 2.5%, and preferably from about 1% to about 2%, by weight, based on the total weight of the finished product.

Conventional flavoring and coloring additives, sugar, and like ingredients allowable under the Standards of Identity for yogurt products can also be used in the initial blend. Since the solids level of the system must be kept below about 18% before and during the culturing step so as not to inhibit bacterial growth, for any formulation in which increases in solid content above this level could result from the incorporation at an early stage in the process of one or more of these conventional materials—sugar, for example—such materials may be held out of the formulation until after culturing has been completed. Solids contents above this level, e.g., ranging from about 27% to about 35%, and preferably from about 30% to about 33%, are, however, preferred in the finished product, since they contribute a more pleasing texture to the product as dispensed.

When preparing chocolate flavored yogurt desserts and dessert toppings embodying this invention, cocoa powder is preferably added to the initial blend as well in amounts ranging from about 2% to about 4%, and preferably from about 3% to about 3.4%, by weight, based on the total weight of the finished product. Adding cocoa powder after culturing has been found to result in gritty product. Despite the commonly-held belief in the dairy industry that blends containing cocoa powder cannot be cultured because cocoa powder's natural alkalinity will inhibit bacterial growth, initial blends prepared in accordance with this invention containing amounts of cocoa powder within the above-stated ranges can be cultured quite successfully.

Similarly, the presence of the stabilizer systems of this invention in the initial blend causes no loss of stability either during or after culturing, probably because the principal components of the stabilizer system, being cellulosic in nature, do not provide a preferred substrate for the yogurt-producing bacteria and hence are not appreciably degraded by these bacteria.

The initial blend, once formed and thoroughly mixed, is conventionally pasteurized, e.g., in a vat, kettle or heat exchanger, and then homogenized, preferably in a positive displacement, two stage homogenizer.

Once homogenized the blend is cooled, preferably in a heat exchanger, to approximately 108°–110° F., admixed with a culture of yogurt-forming bacteria, and incubated until a pH of about 5.2, e.g., from about 5.0 to about 5.4, is reached. Although bacterial cultures typically used to make yogurt normally exhibit optimum growth at about 104° F., when practicing the present invention optimum growth has been found to occur at about 107°–109° F., presumably because of the difference in substrate environment resulting from the presence of the novel stabilizer system. This increase in optimum culturing temperature affords a considerable economic advantage, in that typical culturing time is correspondingly decreased from five hours to about three hours or less.

Once culturing is completed, and preferably before the product is cooled to packaging temperature, other optional dairy ingredients, e.g., pasteurized cream, can be added, as can other constituents of the final product: sugar, flavoring agents, coloring agents, etc., if such materials were not added before pasteurization or if the particular formulation calls for the addition of such ingredients only after pasteurization or both before and after. To insure acceptable product stability, the fat content of the product should be at least about 8%, and preferably from about 9% to about 11%, by weight, based on the total weight of the finished product.

The product is then cooled to about 40° F. and packaged with a suitable propellant in pressure dispensing aerosol containers, such as 7 oz. or 15.5 oz. cans. Any conventional non-toxic, odorless, tasteless and inexpensive propellant gas can be employed, preferably one that is also environmentally harmless: nitrous oxide, nitrogen, carbon dioxide, or the like, with nitrous oxide being preferred.

It has been found that even in those instances where the propellant gas is nitrous oxide the yogurt-forming bacteria present remain viable. Perhaps this is because enough air is entrapped in the product so that over its normal shelf life (approximately 3 months) these aerobic bacteria are able to obtain enough oxygen to survive. But since the product will be stored prior to sale under dairy case refrigeration and kept refrigerated once sold, little or no bacterial growth and reproduction (which would result ultimately in excessive gas formation and the possibility of can explosion) have been observed.

In order that those skilled in the art can more fully understand this invention, the following examples are set forth. These examples are given solely for purposes of illustration, and should not be considered as expressing limitations unless so set forth in the appended claims. All parts and percentages are by weight, unless otherwise stated.

EXAMPLE I

The following components were combined:

| Component | Percent |
|---|---|
| Avicel RC 591 microcrystalline cellulose (FMC Corporation) | 76.5 |
| 7MF 104 carboxymethylcellulose (Hercules Chemical Company) | 7.75 |
| Keltrol xanthan gum (Kelco Division, Merck & Co., Inc.) | 7.75 |
| Tween-Mos 100K–80% + 20% mono- and diglycerides (Durum) | 2.0 |
| Polysorbate 80R mono- and diglycerides (Atlas Chemical Co.) | 4.0 |
| Lactarin MV308 carrageenan gum (Marine Colloids Corp.) | 2.0 | by first plating the Polysorbate 80R mono- and diglycerides onto the microcrystalline cellulose and then blending in the remaining components at room temperature (about 77° F.) in a ribbon blender for about 30 minutes to give a uniformly blended stabilizer system.

The following ingredients were then admixed in a 100 gallon tank for 10 minutes at room temperature:

| Ingredient | Parts |
|---|---|
| Skim milk (1% fat) | 932.80 |
| Stabilizer system (prepared as described above) | 10.60 |

| There were then added: Ingredient | Parts |
|---|---|
| Nonfat dry milk | 250.00 |
| Sodium caseinate (acid stable) | 25.00 |
| Gelatin | 5.00 | and mixing was continued for five minutes.

Once mixed, the thus-obtained initial blend was HTST pasteurized in a tubular heat exchanger and then homogenized in a two stage homogenizer at 1000 psi in the first stage and 1100 psi in the second stage. The homogenized blend exited the homogenizer at 95°–104° F., and was then gently heated to 107°–108° F.

A yogurt-forming bacterial culture containing *Lactobacillus bulgaricus* and *Streptococcus thermophilus* (40.00 parts) was then added to the homogenized blend in a tank with low agitation, and the innoculated blend was incubated at 107°–108° F. until a pH of 5.2 was reached. Cream (488.60 parts) sugar (218.00 parts) and dextrose (70.00 parts) were then blended in until dissolved, using short burst of mixing, and the blend was cooled to 40° F. in a heat exchanger and divided in half.

One half of the blend was admixed with 3.50 parts of vanilla flavoring, the other half with 6.60 parts of strawberry flavoring and 1.80 parts of Carmine red food coloring. The flavored blends were then packaged in 7 oz. aerosol cans under a pressure of 120 psi using nitrous oxide introduced by standard gas injection equipment.

EXAMPLE II

The procedures set out in Example I above were repeated in every essential detail except for the following:

The initial blend was prepared by first admixing in a tank for five minutes:

| Ingredient | Part(s) |
| --- | --- |
| Skim milk (1% fat) | 948.60 |
| Stabilizer system of Example I | 10.60 |
| The following where then added to the tank: | |
| Ingredient | Part(s) |
| Nonfat dry milk | 160.00 |
| Dutch cocoa | 44.00 |
| Black cocoa | 15.00 |
| Sodium caseinate (acid stable) | 25.00 |
| Gelatin | 5.00 |

After culturing and incubation with 40.00 parts of the bacterial culture, cream (472.00 parts) and sugar (291.00 parts) were added, followed by 19.40 parts of natural chocolate flavor and 4.40 parts of vanilla. The mixture was then packaged in 15.50 oz. aerosol cans under a pressure of 150 psi using nitrous oxide introduced by standard gas injection equipment.

The above discussion of this invention is directed primarily to preferred embodiments and practices thereof. It will be readily apparent to those skilled in the art that further changes and modifications in the actual implementations of the concepts described herein can easily be made without departing from the spirit and scope of the invention as defined by the following claims.

We claim:

1. A shelf-stable aerosol dispensable yogurt product containing a stabilizer system comprising (a) at least about 50% by weight of microcrystalline cellulose, (b) from about 2 to about 20% by weight of carboxymethylcellulose and (c) from about 2 to about 20% by weight of a hydrophillic gum or colloid, these weight percentages each being based on the total weight of the stabilizer system.

2. The product as recited in claim 1 in which the hydrophillic gum or colloid is xanthan gum.

3. The product as recited in claim 2 in which the carboxymethylcellulose and xanthan gum are employed in an approximately 1:1 weight ratio.

4. A product as recited in claim 2 or 3 containing from about 70 to about 80% by weight of microcrystalline cellulose, based on the total weight of the stabilizer system.

5. A shelf-stable aerosol dispensible yogurt product containing a stabilizer system comprising (a) from about 70 to about 80% by weight of microcrystalline cellulose, (b) from about 5 to about 10% by weight of carboxymethylcellulose and (c) from about 5% to about 10% by weight of xanthan gum, these weight percentages each being based on the total weight of the stabilizer system.

6. A product as recited in claim 5 in which the carboxymethylcellulose and xanthan gum are employed in an approximately 1:1 weight ratio.

7. A product as recited in claim 6 in which the stabilizer system is present in an amount of from about 0.1 to about 1.0%, by weight, based on the total weight of the product.

8. A product as recited in claim 6 in which the stabilizer system is present in an amount of from about 0.4% to about 0.6%, by weight, based on the total weight of the product.

9. A product as recited in claim 7 having a fat content of at least about 8% by weight, based on the total weight of the product.

10. A product as recited in claim 7 having a fat content of from about 9% to about 11% by weight, based on the total weight of the product.

11. A product as recited in any one of claims 5–10, inclusive, having a solids content ranging from about 27% to about 35%.

12. A product as recited in claim 11 having a solids content ranging from about 30% to about 33%.

13. A yogurt composition initial blend from which a shelf-stable aerosol dispensible yogurt product can be prepared, comprising:
  (1) dairy ingredients selected from the group consisting of cream, milk, partially skimmed milk, skimmed milk and mixtures thereof, and
  (2) from about 0.1% to about 1.0%, by weight, based on the total weight of said product, of a stabilizer system comprising (a) from about 70 to about 80% by weight of microcrystalline cellulose, (b) from about 5 to about 10% by weight of carboxymethylcellulose and (c) from about 5 to about 10% by weight of xanthan gum, the weights of (a), (b) and (c) being based on the weight of the stabilizer system, with the weights of (b) and (c) being in an approximately 1:1 weight ratio.

14. A yogurt composition initial blend as recited in claim 13 containing from about 0.1 to about 0.5%, by weight, based on the total weight of said product, of gelatin.

15. A yogurt composition initial blend as recited in claim 14 containing from about 2 to about 4%, by weight, based on the total weight of said product, of cocoa powder.

16. A yogurt composition initial blend as recited in any one of claims 13–15, inclusive, having a solids content of below about 18%.

17. A method of making a shelf-stable aerosol dispensable yogurt product which comprises:
  (A) pasteurizing a yogurt composition initial blend comprising:
    (1) dairy ingredients selected from the group consisting of cream, milk, partially skimmed milk, skimmed milk and mixtures thereof, and
    (2) from about 0.1% to about 1.0%, by weight, based on the total weight of said product, of a stabilizer system comprising (a) from about 70 to about 80% by weight of microcrystalline cellulose, (b) from about 5 to about 10% by weight of carboxymethylcellulose and (c) from about 5 to about 10% by weight of xanthan gum, the weights of (a), (b) and (c) being based on the weight of the stabilizer system, with the weights of (b) and (c) being in approximately 1:1 weight ratio, (B) homogenizing the pasteurized yogurt composition initial blend, (C) incubating the homogenized yogurt composition initial blend with a culture of yogurt-forming bacteria, and (D) packaging the thus-obtained yogurt product with a propellant in a pressure dispensing aerosol container.

18. A method as recited in claim 17 in which said yogurt composition initial blend contains from about 0.1 to about 5%, by weight, based on the total weight of said yogurt product, of gelatin.

19. A method as recited in claim 18 in which said yogurt composition initial blend contains from about 2 to about 4%, by weight, based on the total weight of said yogurt product, of cocoa powder.

20. A method as recited in any one of claims 17–19, inclusive, in which said yogurt product initial blend has a solids contents of below about 18%.

* * * * *